(12) United States Patent
Park et al.

(10) Patent No.: US 12,212,905 B2
(45) Date of Patent: Jan. 28, 2025

(54) ELECTRONIC DEVICE COMPRISING SPEAKER UNIT

(71) Applicant: Samsung Electronics Co., Ltd., Suwon-si (KR)

(72) Inventors: Changi Park, Suwon-si (KR); Jeho Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 17/982,054

(22) Filed: Nov. 7, 2022

(65) Prior Publication Data

US 2023/0062636 A1    Mar. 2, 2023

Related U.S. Application Data

(63) Continuation of application No. PCT/KR2021/005655, filed on May 6, 2021.

(30) Foreign Application Priority Data

May 12, 2020    (KR) .......................... 10-2020-0056505

(51) Int. Cl.
    *H04R 25/00*        (2006.01)
    *H04R 1/02*         (2006.01)
    *H04R 9/02*         (2006.01)

(52) U.S. Cl.
    CPC .................. *H04R 1/02* (2013.01); *H04R 9/02* (2013.01); *H04R 2499/11* (2013.01)

(58) Field of Classification Search
    CPC ........ H04R 1/02; H04R 2499/11; H04R 9/02; H04R 1/2811; H04R 9/06; H04M 1/03
    (Continued)

(56) References Cited

U.S. PATENT DOCUMENTS 7,556,121 B2    7/2009    Yang et al.
8,126,170 B2    2/2012    Yeates et al.
(Continued)

FOREIGN PATENT DOCUMENTS

JP    2014-110632 A    6/2014
JP    2024502856 A  *  1/2024    ............... H04R 1/04
(Continued)

OTHER PUBLICATIONS

JP-2024502856-A. Translation (Year: 2024).*

*Primary Examiner* — Phylesha Dabney

(74) *Attorney, Agent, or Firm* — Jefferson IP Law, LLP

(57) ABSTRACT

An electronic device is provided. The electronic device includes a housing, a first printed circuit board, a speaker unit including a speaker housing and a diaphragm, and a support member including a first portion surrounding a portion of the speaker unit and spaced apart from a surface of the speaker unit by a predetermined gap and a second portion extending from the first portion to cover a surface of a portion of the first printed circuit board. A first space located on one side of the diaphragm is formed in the speaker housing, and a second space in fluid communication with the first space is formed between the first portion and the surface of the speaker unit. The second portion and the first printed circuit board form at least a portion of a substantially sealed third space in fluid communication with the second space.

20 Claims, 10 Drawing Sheets

(58) Field of Classification Search
USPC .......................................................... 381/386
See application file for complete search history.

(56) References Cited

U.S. PATENT DOCUMENTS

| | | |
|---|---|---|
| 8,265,329 B2 | 9/2012 | Lin et al. |
| 8,437,493 B2 | 5/2013 | Nho et al. |
| 8,457,333 B2 | 6/2013 | Yeates et al. |
| 8,494,207 B2 | 7/2013 | Lin et al. |
| 8,917,897 B2 | 12/2014 | Nakagawa et al. |
| 9,042,592 B2 | 5/2015 | Chen et al. |
| 9,307,314 B2 | 4/2016 | Kim et al. |
| 9,609,438 B2 | 3/2017 | Kim et al. |
| 9,883,266 B2 | 1/2018 | Dai et al. |
| 11,032,636 B2 | 6/2021 | Chen et al. |
| 2008/0144879 A1 | 6/2008 | Yang et al. |
| 2009/0034777 A1 | 2/2009 | Nho et al. |
| 2010/0061577 A1 | 3/2010 | Yeates et al. |
| 2012/0148081 A1 | 6/2012 | Yeates et al. |
| 2012/0298441 A1 | 11/2012 | Lin et al. |
| 2013/0308799 A1 | 11/2013 | Lin et al. |
| 2013/0343590 A1 | 12/2013 | Nakagawa et al. |
| 2014/0153769 A1 | 6/2014 | Chen et al. |
| 2014/0369533 A1 | 12/2014 | Kim et al. |
| 2016/0088398 A1 | 3/2016 | Kim et al. |
| 2016/0323675 A1 | 11/2016 | Dai et al. |
| 2019/0320257 A1 | 10/2019 | Dyreby |
| 2020/0045409 A1 | 2/2020 | Chen et al. |

FOREIGN PATENT DOCUMENTS

| | | | | |
|---|---|---|---|---|
| KR | 10-2002-0011488 A | 2/2002 | | |
| KR | 10-2005-0113465 A | 12/2005 | | |
| KR | 10-1155053 B1 | 6/2012 | | |
| KR | 10-2012-0131088 A | 12/2012 | | |
| KR | 10-2014-0145068 A | 12/2014 | | |
| KR | 10-1477713 B1 | 12/2014 | | |
| KR | 10-2015-0129431 A | 11/2015 | | |
| WO | WO-2020141760 A1 * | 7/2020 | ............ | H04M 1/026 |
| WO | WO-2021201640 A1 * | 10/2021 | ............ | H04M 1/035 |
| WO | WO-2022108172 A1 * | 5/2022 | ............ | G06F 1/1626 |

* cited by examiner

ELECTRONIC DEVICE COMPRISING SPEAKER UNIT

CROSS-REFERENCE TO RELATED APPLICATION(S)

This application is a continuation application, claiming priority under § 365(c), of an International application No. PCT/KR2021/005655, filed on May 6, 2021, which is based on and claims the benefit of a Korean patent application number 10-2020-0056505, filed on May 12, 2020, in the Korean Intellectual Property Office, the disclosure of which is incorporated by reference herein in its entirety.

BACKGROUND

1. Field

The disclosure relates to an electronic device including a speaker unit.

2. Description of Related Art

An electronic device may include at least one speaker unit disposed in the housing. The speaker unit may be configured to convert an electrical signal into an audio signal. For example, the speaker unit may generate and transmit an audio signal by vibrating air based on an electrical signal. In this case, a space in which air vibrated by the speaker unit is accommodated may be defined. The amount (e.g., volume) of air included in the space may be related to sound quality of the speaker unit. The space may be referred to as a front volume and a rear volume with respect to a diaphragm included in the speaker unit.

The above information is presented as background information only to assist with an understanding of the disclosure. No determination has been made, and no assertion is made, as to whether any of the above might be applicable as prior art with regard to the disclosure.

SUMMARY

A speaker unit included in a mobile electronic device may have a volume limited by a limited inner space of the mobile electronic device. For example, when the volume of the speaker unit is increased, the sizes of other components (e.g., a printed circuit board and a battery) of the electronic device may be limited. Furthermore, the speaker unit may include a rear volume adjacent to a back plate. In general, the thin back plate may excessively vibrate when the speaker unit operates.

Aspects of the disclosure are to address at least the above-mentioned problems and/or disadvantages and to provide at least the advantages described below. Accordingly, an aspect of the disclosure is to provide an electronic device for providing an expanded volume to a speaker unit in a limited inner space of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a first printed circuit board disposed in the housing, a speaker unit disposed adjacent to the first printed circuit board, the speaker unit including a speaker housing and a diaphragm that is disposed in the speaker housing and that vibrates based on an electrical signal, and a support member including a first portion that surrounds at least a portion of the speaker unit and that is spaced apart from a surface of the speaker unit by a predetermined gap and a second portion that extends from the first portion to cover a surface of at least a portion of the first printed circuit board when the first printed circuit board is viewed from above. A first space located on one side of the diaphragm is formed in the speaker housing, and a second space in fluid communication with the first space is formed between the first portion and the surface of the speaker unit. The second portion and the first printed circuit board form at least a portion of a substantially sealed third space in fluid communication with the second space.

In accordance with another aspect of the disclosure, an electronic device is provided. The electronic device includes a front plate that forms a front surface, a back plate that forms a rear surface and faces away from the front plate, a bracket including a frame structure that surrounds a space between the front plate and the back plate and a plate structure that extends into the space between the front plate and the back plate from the frame structure, a support member disposed between the plate structure and the back plate, a substrate structure, at least a portion of which is disposed between the support member and the plate structure, and a speaker unit disposed between the support member and the plate structure. The substrate structure includes a first printed circuit board connected with the support member and having a first through-hole formed therein, a second printed circuit board disposed on the plate structure, and an interposer that surrounds a third space between the first printed circuit board and the second printed circuit board. The support member surrounds at least a portion of the speaker unit to form a second space in fluid communication with a first space in the speaker unit and extends to the first printed circuit board such that the second space is in fluid communication with the third space.

The electronic devices according to the embodiments of the disclosure may provide expanded volumes without increasing the sizes of spaces occupied by the speaker units. Thus, sound qualities of the electronic devices may be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
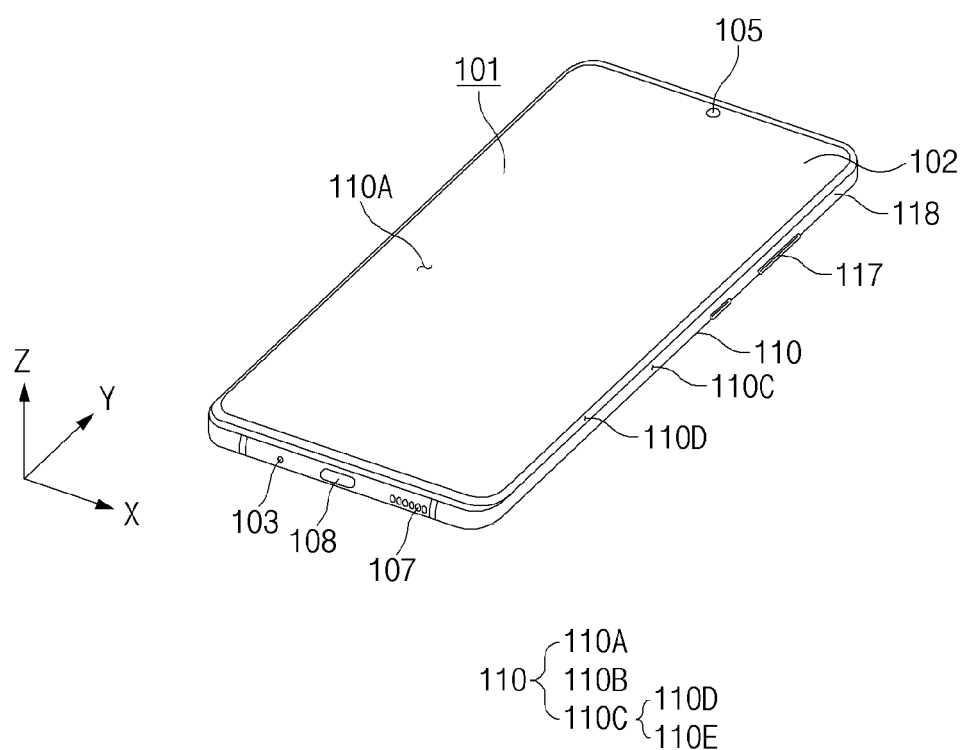
FIG. 1 is a front perspective view of an electronic device according to an embodiment of the disclosure.

FIG. 1 is a front perspective view of an electronic device according to an embodiment of the disclosure.

Figure 2:
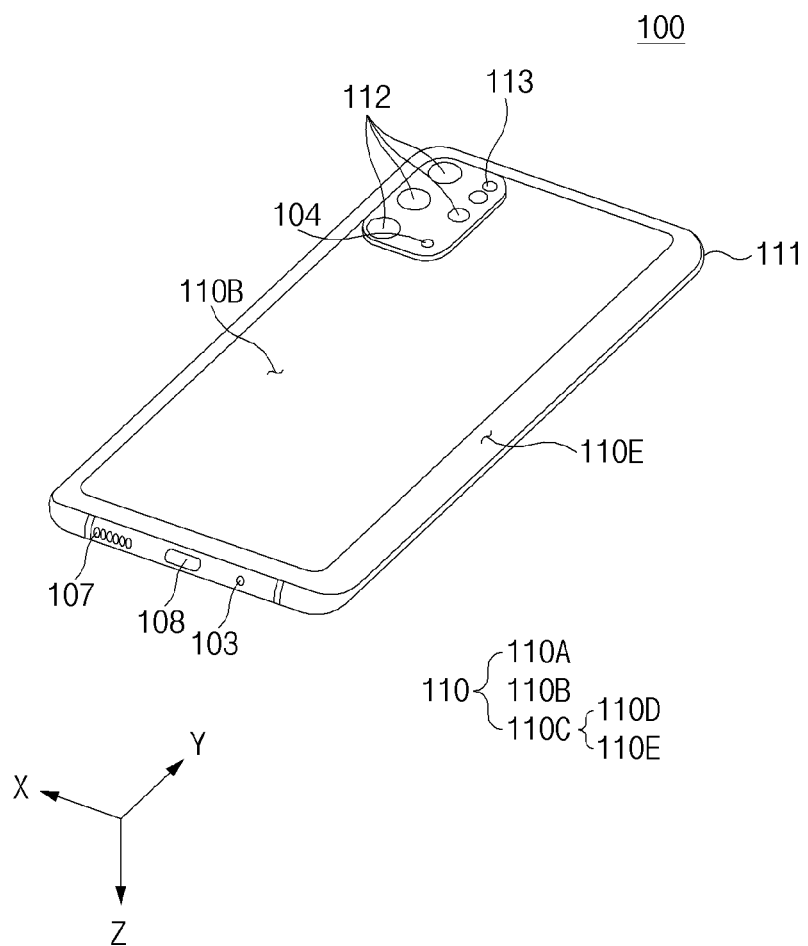
FIG. 2 is a rear perspective view of the electronic device according to an embodiment of the disclosure.

FIG. 2 is a rear perspective view of an electronic device according to an embodiment of the disclosure.

Referring to FIGS. 1 and 2, an electronic device 100 according to an embodiment may include a housing 110 that includes a first surface (or, a front surface) 110A, a second surface (or, a rear surface) 110B, and a side surface 110C surrounding a space between the first surface 110A and the second surface 110B.

In another embodiment (not illustrated), the housing 110 may refer to a structure that forms a part of the first surface 110A, the second surface 110B, and the side surface 110C of FIG. 1.

According to an embodiment, the first surface 110A may be formed by a front plate 102, at least a portion of which is substantially transparent (e.g., a glass plate including various coating layers, or a polymer plate). The second surface 110B may be formed by a back plate 111 that is substantially opaque. The back plate 111 may be formed of, for example, coated or colored glass, ceramic, a polymer, metal (e.g., aluminum, stainless steel (STS), or magnesium), or a combination of at least two of the aforementioned materials. The side surface 110C may be formed by a side bezel structure (or, a "frame structure") 118 that is coupled with the front plate 102 and the back plate 111 and that includes metal and/or a polymer.

In some embodiments, the back plate 111 and the side bezel structure 118 may be integrally formed with each other and may include the same material (e.g., a metallic material such as aluminum).

In the illustrated embodiment, the front plate 102 may include, at opposite long edges thereof, two first regions 110D that curvedly and seamlessly extend from the first surface 110A toward the back plate 111.

In the illustrated embodiment, the back plate 111 may include, at opposite long edges thereof, two second regions 110E that curvedly and seamlessly extend from the second surface 110B toward the front plate 102.

In some embodiments, the front plate 102 (or, the back plate 111) may include only one of the first regions 110D (or, the second regions 110E). In another embodiment, the front plate 102 (or, the back plate 111) may not include a part of the first regions 110D (or, the second regions 110E).

In the embodiments, when viewed from a side of the electronic device 100, the side bezel structure 118 may have a first thickness (or, width) at sides (e.g., short sides) not including the first regions 110D or the second regions 110E and may have a second thickness at sides (e.g., long sides) including the first regions 110D or the second regions 110E, the second thickness being smaller than the first thickness.

According to an embodiment, the electronic device 100 may include at least one of a display 101, audio modules 103, 104, and 107, a sensor module (not illustrated), camera modules 105 and 112, key input devices 117, or a connector hole 108. In some embodiments, the electronic device 100 may not include at least one component (e.g., the key input devices 117) among the aforementioned components, or may additionally include other component(s) (e.g., a light emitting element (not illustrated)).

The display 101, for example, may be exposed through most of the front plate 102. In some embodiments, at least a portion of the display 101 may be exposed through the front plate 102 that includes the first surface 110A and the first regions 110D of the side surface 110C.

In some embodiments, the periphery of the display 101 may be formed to be substantially the same as the shape of the adjacent outside edge of the front plate 102. In another embodiment (not illustrated), to expand the area by which the display 101 is exposed, the gap between the outside edge of the display 101 and the outside edge of the front plate 102 may be formed to be substantially constant.

In an embodiment, a surface of the housing 110 (or, the front plate 102) may include a screen display area that is formed as the display 101 is visually exposed. For example, the screen display area may include the first surface 110A and the first regions 110D of the side surface.

In some embodiments, the screen display area (e.g., the first surface 110A and the first regions 110D) may include a sensing region (not illustrated) that is configured to obtain biometric information of a user. Here, when the screen display area includes the sensing region, this may mean that at least a portion of the sensing region overlaps the screen display area. For example, the sensing region may refer to a region capable of displaying visual information by the display 101 like the other regions of the screen display area and additionally obtaining the user's biometric information (e.g., fingerprint).

In an embodiment, the screen display area (e.g., the first surface 110A and the first regions 110D) of the display 101 may include a region through which a first camera module 105 (e.g., a punch hole camera) is visually exposed. For example, the region through which the first camera module 105 is exposed may be surrounded by the screen display area. In various embodiments, the first camera module 105 may include a plurality of camera devices.

In another embodiment (not illustrated), the display 101 may be coupled with, or disposed adjacent to, touch detection circuitry, a pressure sensor capable of measuring the intensity (pressure) of a touch, and/or a digitizer that detects a stylus pen of a magnetic field type.

In some embodiments, at least some of the key input devices 117 may be disposed on the side surface 110C (e.g., the first regions 110D and/or the second regions 110E).

In some embodiments, the audio modules 103, 104, and 107 may include microphone holes 103 and 104 and speaker hole 107. A microphone for obtaining external sound may be disposed in the microphone holes 103 and 104. In some embodiments, the microphone may include a plurality of microphones to detect the direction of sound.

In some embodiments, the microphone hole 104 formed in a partial region of the second surface 110B may be disposed adjacent to the camera modules 105, 112, and 113. For example, the microphone hole 104 may obtain sounds when the camera modules 105, 112, and 113 are executed, or may obtain sounds when other functions are executed. The speaker hole 107 may include an external speaker hole 107 and a receiver hole for telephone call (not illustrated). In some embodiments, the speaker hole 107 and the microphone holes 103 and 104 may be implemented as a single hole.

In an embodiment, the electronic device 100 may include a speaker in fluid communication with the speaker hole 107. In some embodiments, the speaker may include a piezoelectric speaker from which the speaker hole 107 is omitted.

The sensor module (not illustrated) may generate an electrical signal or a data value that corresponds to an operational state inside the electronic device 100 or an environmental state external to the electronic device 100. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

The camera modules 105, 112, and 113 may include first camera module 105 (e.g., a punch hole camera) exposed on the first surface 110A of the electronic device 100, and second camera module 112 and/or flash 113 exposed on the second surface 110B of the electronic device 100.

In an embodiment, the first camera module 105 may be exposed through a portion of the screen display area (e.g., the first surface 110A and the first regions 110D) of the display 101. For example, the first camera module 105 may be exposed on a partial region of the screen display area through an opening (not illustrated) that is formed in a portion of the display 101.

In an embodiment, the second camera module 112 may include a plurality of camera modules (e.g., a dual camera, a triple camera, or a quad camera). However, the second camera module 112 is not necessarily limited to including the plurality of camera modules and may include one camera module.

The first camera module 105 and the second camera module 112 may include one or more lenses, an image sensor, and/or an image signal processor. The flash 113 may include, for example, a light emitting diode or a xenon lamp. In some embodiments, two or more lenses (an IR camera lens, a wide angle lens, and a telephoto lens) and image sensors may be disposed on one surface of the electronic device 100.

The key input devices 117 may be disposed on the side surface 110C of the housing 110. In another embodiment, the electronic device 100 may not include all or some of the aforementioned key input devices 117, and the key input devices 117 not included may be implemented in a different form, such as a soft key, on the display 101. In some embodiments, the key input devices may include a sensor module (not illustrated) that forms the sensing region (not illustrated) that is included in the screen display area (e.g., the first surface 110A and the first regions 110D).

The connector hole 108 may include a first connector hole 108 capable of accommodating a connector (e.g., a USB connector) for transmitting and receiving power and/or data with an external electronic device and/or a second connector hole (not illustrated) (e.g., an earphone jack) capable of accommodating a connector for transmitting and receiving audio signals with an external electronic device.

In various embodiments, the electronic device 100 may include a light emitting element (not illustrated). The light emitting element, for example, may be disposed on the first surface 110A of the housing 110. The light emitting element, for example, may provide state information of the electronic device 100 in the form of light. In another embodiment, the light emitting element may provide, for example, a light source that operates in conjunction with operation of the first camera module 105. The light emitting element may include, for example, an LED, an IR LED, and/or a xenon lamp.

Figure 3:
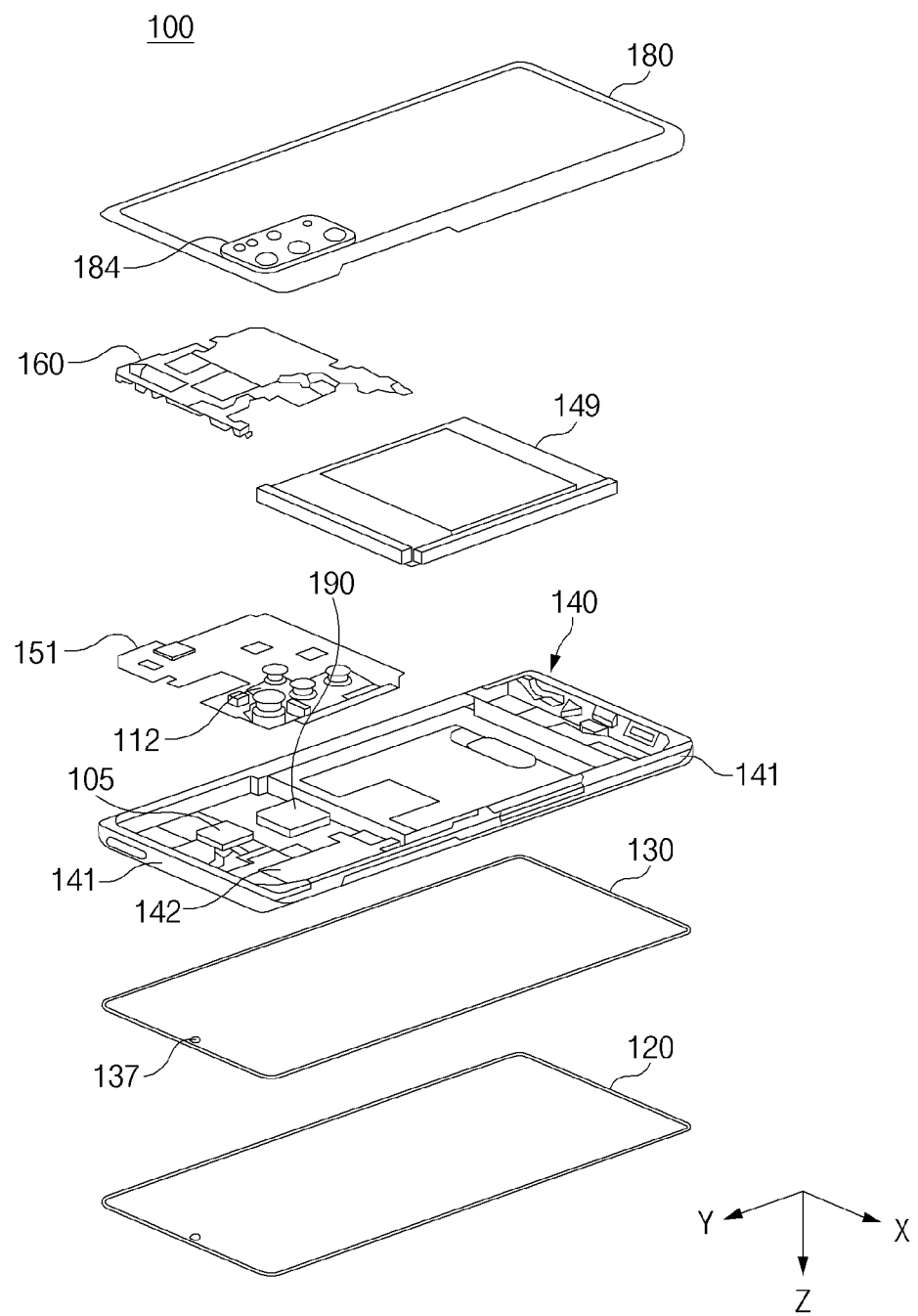
FIG. 3 is an exploded perspective view of the electronic device according to an embodiment of the disclosure.

FIG. 3 is an exploded perspective view of the electronic device according to an embodiment of the disclosure.

Referring to FIG. 3, an electronic device 100 may include a front plate 120 (e.g., the first surface 110A and the first regions 110D of FIG. 1), a display 130 (e.g., the display 101 of FIG. 1), a bracket 140, a printed circuit board 151, a battery 149, a support member 160 (e.g., a rear case), and a back plate 180 (e.g., the second surface 110B and the second regions 110E of FIG. 2).

In some embodiments, the electronic device 100 may not include at least one component (e.g., the support member 160) among the aforementioned components, or may additionally include other component(s). At least one of the components of the electronic device 100 may be identical or similar to at least one of the components of the electronic device 100 of FIG. 1 or 2, and repetitive descriptions will hereinafter be omitted.

In an embodiment, the bracket 140 may include a frame structure 141 that forms a surface of the electronic device 100 (e.g., a portion of the side surface 110C of FIG. 1) and a plate structure 142 extending from the frame structure 141 into the electronic device 100.

The plate structure 142 may be located inside the electronic device 100 and may be connected with the frame structure 141, or may be integrally formed with the frame structure 141. The plate structure 142 may be formed of, for example, a metallic material and/or a nonmetallic (e.g., polymer) material. The display 130 may be coupled to one surface of the plate structure 142, and printed circuit board 151 may be coupled to an opposite surface of the plate structure 142. The printed circuit board 151 may have a processor, a memory, and/or an interface mounted thereon. The processor may include, for example, one or more of a central processing unit, an application processor, a graphic processing unit, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. For example, the interface may electrically or physically connect the electronic device 100 with an external electronic device and may include a USB connector, an SD card/MMC connector, or an audio connector.

The battery 149, which is a device for supplying power to at least one component of the electronic device 100, may include, for example, a primary cell that is not rechargeable, a secondary cell that is rechargeable, or a fuel cell. At least a portion of the battery 149, for example, may be disposed on substantially the same plane as the printed circuit board 151. The battery 149 may be integrally disposed inside the electronic device 100, or may be disposed to be detachable from the electronic device 100.

In various embodiments, the first camera module 105 may be disposed on the plate structure 142 of the bracket 140 such that a lens is exposed through a partial region of the front plate 120 (e.g., the first surface 110A of FIG. 1) of the electronic device 100. For example, the first camera module 105 may be disposed such that the optical axis of the lens is at least partially aligned with a hole or recess 137 formed in the display 130. For example, the region through which the lens is exposed may be formed in the front plate 120. For example, the first camera module 105 may include a punch hole camera, at least a portion of which is disposed in the hole or recess 137 formed in a rear surface of the display 130.

In various embodiments, the second camera module 112 may be disposed on the printed circuit board 151 such that a lens is exposed through a camera region 184 of the back plate 180 of the electronic device 100 (e.g., the second surface 110B of FIG. 2).

In the illustrated embodiment, the camera region 184 may be formed on a surface of the back plate 180 (e.g., the second surface 110B of FIG. 2). In various embodiments, the camera region 184 may be formed to be at least partially transparent such that external light is incident on the lens of the second camera module 112. In the illustrated embodiment, at least a portion of the camera region 184 may protrude to a predetermined height from the surface of the back plate 180. However, without being limited thereto, the camera region 184 may form substantially the same plane as the surface of the back plate 180 in various embodiments.

In various embodiments, the front plate 120, the back plate 180, and at least a portion of the frame structure 141 may form a housing (e.g., the housing 110 of FIGS. 1 and 2).

Figure 4:
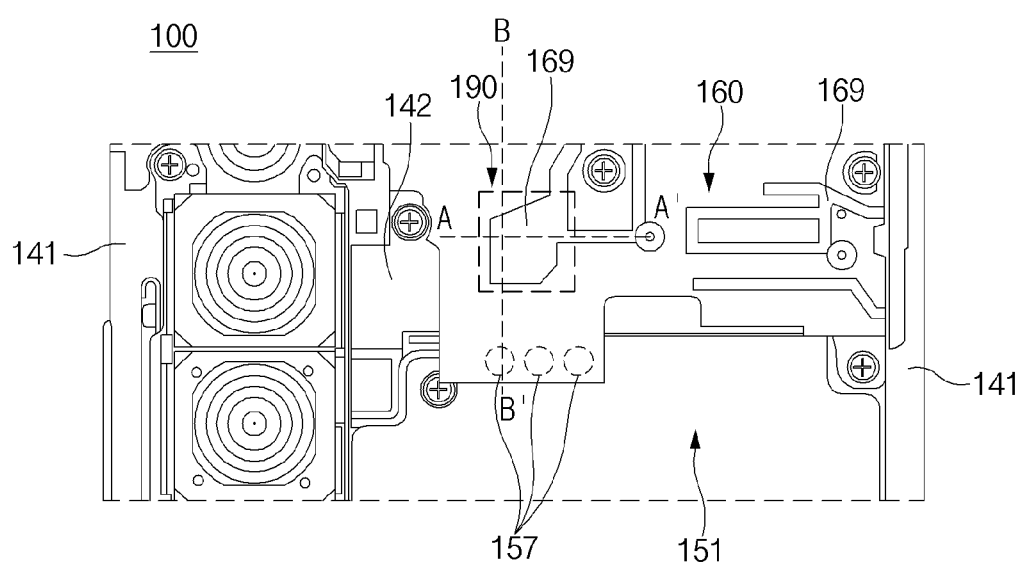
FIG. 4 is a plan view illustrating a rear side of the electronic device according to an embodiment of the disclosure.

FIG. 4 is a plan view illustrating a rear side of the electronic device according to an embodiment of the disclosure. FIG. 4 is a view in which the back plate is omitted from the electronic device illustrated in FIG. 3.

Referring to FIG. 4, an electronic device 100 may include a frame structure 141, a plate structure 142, a support member 160, a printed circuit board 151, and a speaker unit 190.

In an embodiment, the frame structure 141 may form the housing of the electronic device 100 (e.g., the housing 110 of FIG. 1) together with the front plate (e.g., the front plate 120 of FIG. 3) and the back plate (e.g., the back plate 180 of FIG. 3). In an embodiment, the frame structure 141 may surround the plate structure 142.

In an embodiment, the plate structure 142 may extend from the frame structure 141 toward an inner space of the electronic device 100. The plate structure 142 may be coupled to the frame structure 141, or may extend from the frame structure 141. Components of the electronic device 100 may be disposed on the plate structure 142. For example, the speaker unit 190 and the printed circuit board 151 may be disposed on the plate structure 142.

In an embodiment, the support member 160 may be disposed to overlap at least a portion of the plate structure 142 when the rear surface of the electronic device 100 (e.g., the second surface 110B of FIG. 2) is viewed from above. For example, the support member 160 may be disposed to cover the speaker unit 190 located on the plate structure 142. Alternatively, the support member 160 may include the speaker unit 190. For example, the support member 160 and the speaker unit 190 may be assembled as separate structures, or may be substantially integrally coupled with each other. For example, the speaker unit 190 may be coupled to the support member 160 through bonding and/or ultrasonic welding.

In various embodiments, a portion of the speaker unit 190 may be formed by the support member 160. For example, a portion of a speaker housing of the speaker unit 190 (e.g., a speaker housing 191 of FIG. 5) may be formed by a portion of the support member 160.

In an embodiment, at least a portion of the support member 160 may extend to cover a portion of the printed circuit board 151. For example, the support member 160 may extend to cover a through-hole 157 formed in the printed circuit board 151.

In an embodiment, the support member 160 may include a polymer material. The support member 160 may be formed to be non-conductive. A conductive pattern 169 may be formed on the support member 160. The conductive pattern 169 may be electrically connected with the printed circuit board 151. For example, the conductive pattern 169 may be electrically connected with communication circuitry (not illustrated) that is disposed on the printed circuit board 151 and may function as an antenna.

In an embodiment, at least a partial region of the printed circuit board 151 may be hidden by the support member 160 when the rear surface of the electronic device 100 is viewed from above. The printed circuit board 151 may include one or more through-holes 157. For example, the through-holes 157 of the printed circuit board 151 may be covered by the support member 160.

Figure 5:
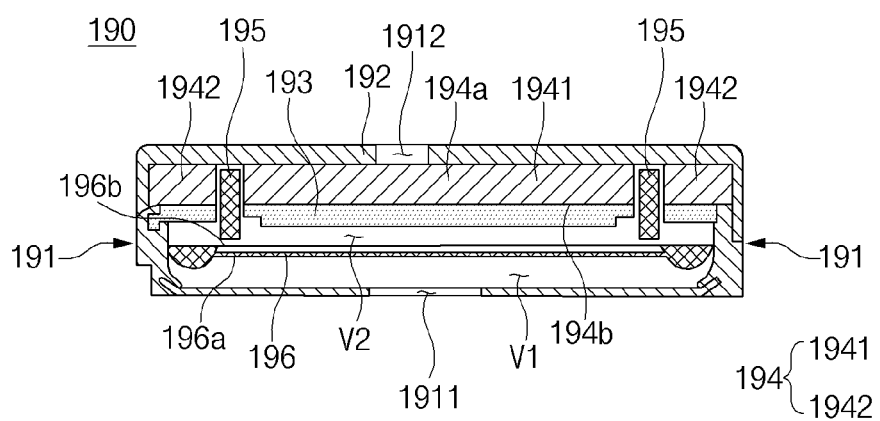
FIG. 5 is a sectional view of a speaker unit of the electronic device according to an embodiment of the disclosure.

FIG. 5 is a sectional view of the speaker unit of an electronic device according to an embodiment of the disclosure. FIG. 5 is a sectional view taken along line A-A' of FIG. 4.

Referring to FIG. 5, in describing a speaker unit 190 according to an embodiment of the disclosure, a front volume V1 may refer to a space that faces a first surface 196a of a diaphragm 196 and that is fluidically connected with the outside of the electronic device 100 such that air flows out of the electronic device 100. For example, the front volume V1 may include air in fluid communication with the outside of the electronic device 100.

In describing the speaker unit 190 according to an embodiment of the disclosure, a rear volume V2 may refer to a space that faces a second surface 196b of the diaphragm 196 and includes air. For example, the rear volume V2 may be sealed from the outside of the electronic device 100. For example, the rear volume V2 may refer to a space fluidically connected with a portion of the inner space of the electronic device 100 (e.g., an inner space of the housing 110 of FIG. 1) and cut off from the outside of the electronic device 100.

In various embodiments, the rear volume V2 may further include an outer space of the speaker unit 190. For example, the outer space may include a portion of the inner space of the electronic device 100 that is fluidically connected with the rear volume V2 illustrated in FIG. 5. For example, the rear volume V2 may be fluidically connected with the inner space of the electronic device 100 through an opening 199 formed in the speaker unit 190.

In describing the speaker unit 190 according to an embodiment of the disclosure, sealing may generally mean that a space (e.g., the front volume V1 and the rear volume V2) in which a sound wave vibrates is sealed to substantially have a predetermined volume, but does not mean physically complete sealing.

In an embodiment, the speaker unit 190 may include the speaker housing 191, a first yoke 192, a second yoke 193, a magnet 194, a coil 195, and the diaphragm 196.

In an embodiment, the speaker housing 191 may include a first opening 1911 and a second opening 1912 formed in surfaces thereof. For example, the first opening 1911 may be located on one side with respect to the diaphragm 196 (e.g., on a lower side based on the drawing), and the second opening 1912 may be located on an opposite side with respect to the diaphragm 196 (e.g., on an upper side based on the drawing). The coil 195 and at least a portion of the diaphragm 196 may be disposed in the speaker housing 191. The second yoke 193 may be disposed in the speaker housing 191. A portion of the front volume V1 and a portion of the rear volume V2 may be formed in the speaker housing 191. For example, the front volume V1 may include a portion of an inner space of the speaker housing 191 that faces the first surface 196a of the diaphragm 196. For example, the rear volume V2 may include a portion of the inner space of the speaker housing 191 that faces the second surface 196b of the diaphragm 196.

In another embodiment, the speaker housing 191 may include the yokes 192 and 193, the magnet 194, the coil 195, and the diaphragm 196 therein. In this case, inner spaces of the speaker housing 191 may be formed to be sealed from each other by the diaphragm 196. The inner spaces of the speaker housing 191 may be defined as a region (e.g., the front volume V1) located on one side of the diaphragm 196 and a region (e.g., the rear volume V2) located on an opposite side of the diaphragm 196.

In various embodiments, the front volume V1 may be fluidically connected such that a fluid flows out of the electronic device 100 through the first opening 1911. For example, the front volume V1 may be in fluid communication with the outside of the electronic device through the first opening 1911. In various embodiments, the diaphragm 196 may vibrate air in the speaker housing 191 (e.g., the front volume V1). An audio signal may travel into a space due to the vibration of the air. For example, the audio signal may be transmitted to the user through the first opening 1911.

In various embodiments, the rear volume V2 may be fluidically connected with the inner space of the electronic device 100 through the second opening 1912. For example, the rear volume V2 may be in fluid communication with the inner space of the electronic device 100 through the second opening 1912.

In various embodiments, the speaker housing 191 may include a first surface (e.g., a lower surface based on the drawing) in which the first opening 1911 is formed and a second surface (e.g., an upper surface based on the drawing) in which the second opening 1912 is formed. In this case, at least a portion of the second surface may be formed by the first yoke 192. For example, the second opening 1912 may be formed in the first yoke. In various embodiments, the speaker housing 191 may be provided in the form of a frame.

The first yoke 192 may be disposed on the speaker housing 191 having a frame form and may form a surface of the speaker unit.

In an embodiment, the first yoke 192 may be formed to surround the magnet 194 together with the second yoke 193. The first yoke 192 and the second yoke 193 may form a magnetic field together with the magnet 194. For example, a magnetic field emanating from an upper surface 194a of the magnet 194 may enter a lower surface 194b of the magnet 194 via the first yoke 192 and the second yoke 193. Alternatively, a magnetic field emanating from the lower surface 194b of the magnet 194 may enter the upper surface 194a of the magnet 194 via the second yoke 193 and the first yoke 192.

In an embodiment, the coil 195 may surround at least a portion of the magnet 194 one or more times. For example, the coil 195 may surround a first portion 1941 of the magnet 194. The magnet 194 may include the first portion 1941 (e.g., a middle portion) and a second portion 1942 (e.g., edge portions). The coil 195 may be connected to the diaphragm 196 to vibrate together with the diaphragm 196. In an embodiment, an electrical signal may be applied to the coil 195. For example, the electrical signal may include an analog signal having a wave form. The coil 195 may be configured to vibrate at a predetermined frequency depending on the applied electrical signal.

In an embodiment, the diaphragm 196 may be disposed in the inner space of the speaker housing 191 such that the front volume V1 and the rear volume V2 are not in fluid communication with each other. In an embodiment, the diaphragm 196 may be connected with the coil 195 to vibrate together with the coil 195 as the coil 195 vibrates. The diaphragm 196 may vibrate air to generate an audio signal. The audio signal may be transmitted in a traveling direction of an air wave (e.g., a sound wave).

In an embodiment, as the diaphragm 196 vibrates, air included in the front volume V1 and air included in the rear volume V2 may vibrate, and thus an audio signal may be generated. In various embodiments, an audio signal generated by vibration of air included in the front volume V1 may travel to the outside of the electronic device 100 through the first opening 1911 of the speaker housing 191. In various embodiments, an audio signal generated by vibration of air included in the rear volume V2 may travel to the outside of the speaker housing 191 through the second opening 1912 of the speaker housing 191.

According to an embodiment, the electronic device 100 may include various types of speaker units 190 depending on audio frequency characteristics (e.g., sound ranges). In various embodiments, the speaker unit 190 may include a woofer speaker that produces sounds of low pitch and/or a tweeter speaker that produces sounds of high pitch. For example, the woofer speaker may reproduce low-frequency sounds from 100 Hz to 299 Hz, and the tweeter speaker may reproduce high-frequency sounds from 3 KHz to 6.9 KHz. However, the type of the speaker unit 190 included in the electronic device 100 is not limited to the above-described types. According to embodiments, the speaker unit 190 may include a sub-woofer speaker, a mid-range speaker (e.g., a squawker speaker), or a super tweeter speaker.

Figure 6:
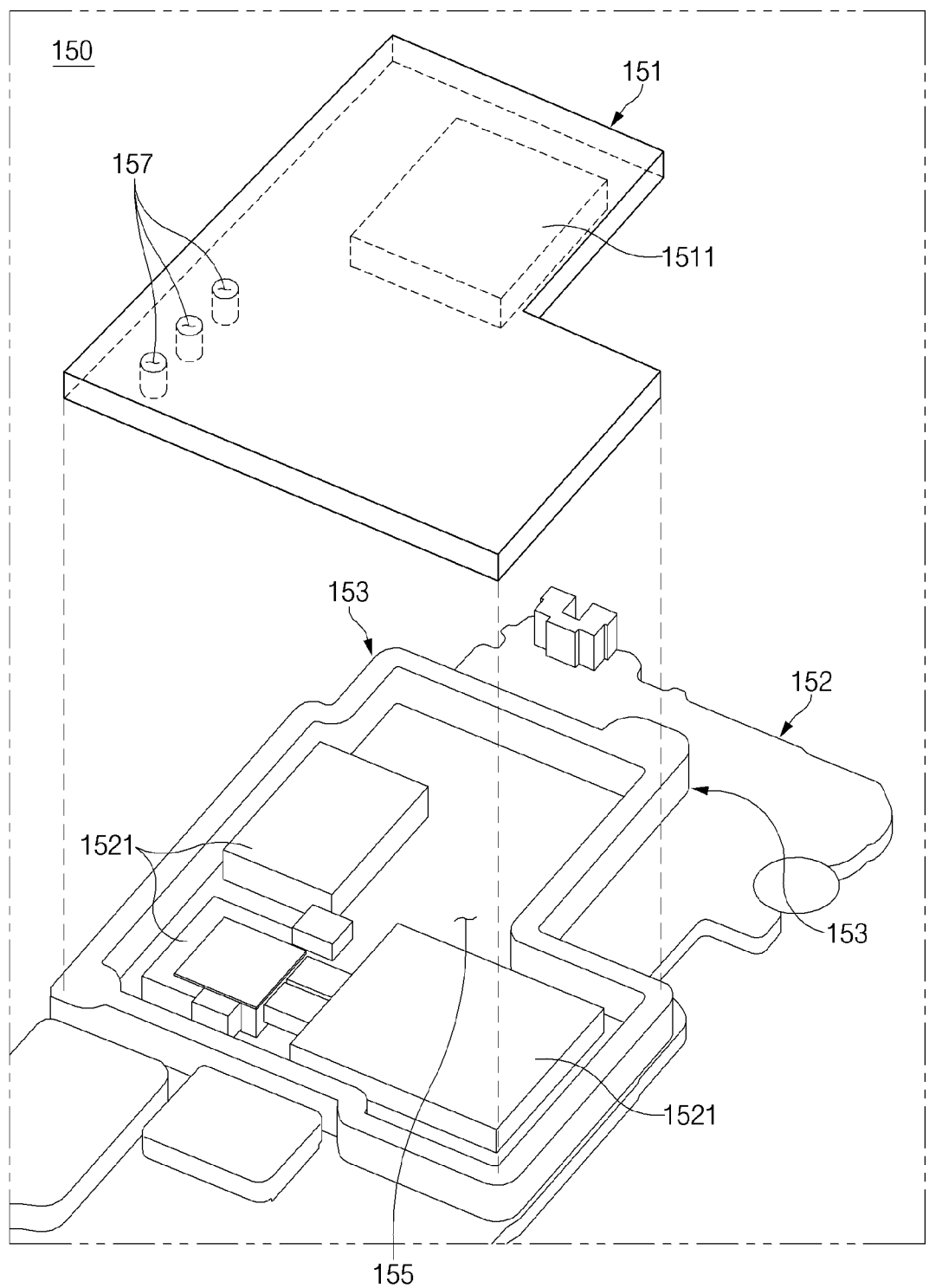
FIG. 6 is a view illustrating a substrate structure of the electronic device according to an embodiment of the disclosure.

FIG. 6 is a view illustrating a substrate structure of an electronic device according to an embodiment of the disclosure.

Referring to FIG. 6, in an embodiment, a substrate structure 150 may include a first printed circuit board 151, a second printed circuit board 152, and an interposer 153.

In an embodiment, the first printed circuit board 151 may be disposed between the second printed circuit board 152 and the back plate 180. For example, the first printed circuit board 151 may face the second printed circuit board 152.

In an embodiment, first through-holes 157 may be formed in the first printed circuit board 151. The first through-holes 157 may be in fluid communication with a space 155 formed between the first printed circuit board 151 and the second printed circuit board 152.

In an embodiment, the first printed circuit board 151 may be connected to the interposer 153. The first printed circuit board 151 may be electrically connected with the second printed circuit board 152 by the interposer 153. For example, a first electric element 1511 disposed on the first printed circuit board 151 may be electrically connected with a second electric element 1521 disposed on the second printed circuit board 152 through the interposer 153.

In an embodiment, the second printed circuit board 152 may face the first printed circuit board 151 and may be spaced apart from the first printed circuit board 151 by a predetermined gap.

In an embodiment, the interposer 153 may be formed to surround the space 155 between the first printed circuit board 151 and the second printed circuit board 152. A portion of the first electric element 1511 included in the first printed circuit board 151 and/or a portion of the second electric element 1521 included in the second printed circuit board 152 may be disposed in the space 155.

In an embodiment, the first electric element 1511 and the second electric element 1521 disposed in the space 155 may include an electric element that requires a relatively high transmission rate (e.g., a transmission rate of 1 Gbps or more). For example, each of the first electric element 1511 and the second electric element 1521 disposed in the space 155 may include a processor and a memory. Accordingly, interference of noise with another electric element may be prevented.

Through the illustrated substrate structure 150, the limited inner space of the electronic device 100 may be efficiently used.

Figure 7:
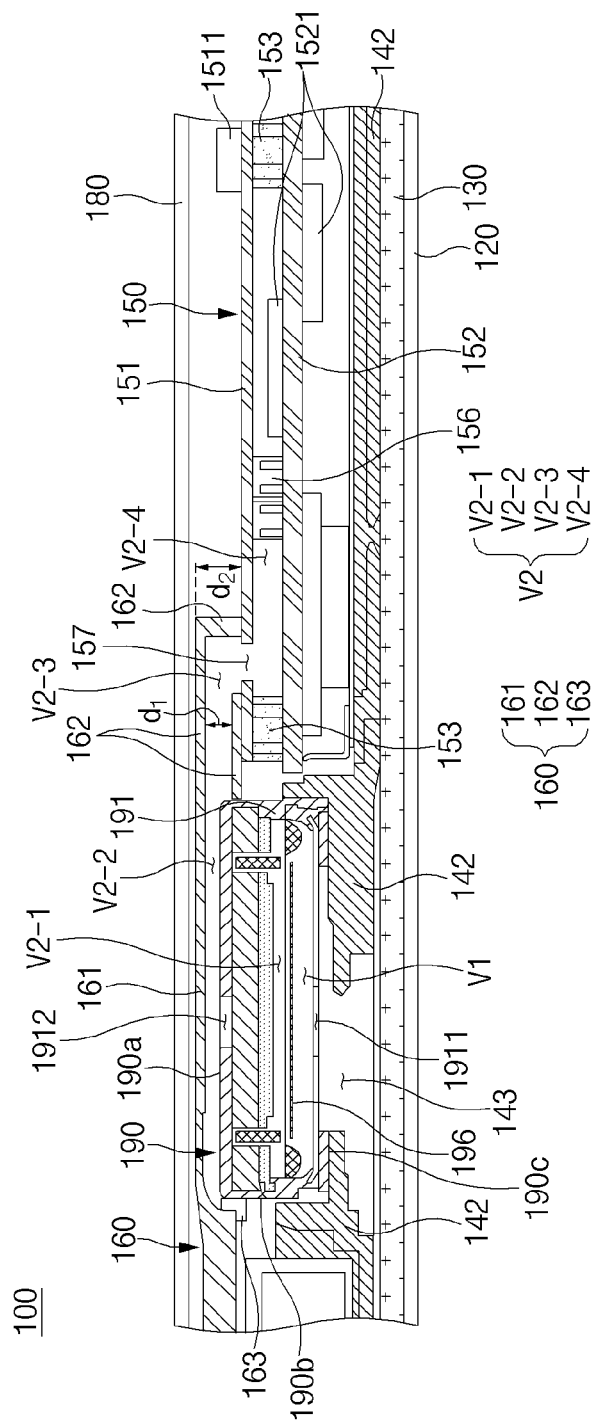
FIG. 7 is a sectional view of the electronic device according to an embodiment of the disclosure.

FIG. 7 is a sectional view of an electronic device according to an embodiment of the disclosure.

FIG. 7 is a sectional view taken along line B-B' of FIG. 4.

In an embodiment, the electronic device 100 may include the speaker unit 190, the substrate structure 150, and the support member 160 that are disposed on the plate structure 142.

In an embodiment, the support member 160 may be disposed to form the rear volume V2 of the speaker unit 190 together with the speaker unit 190 and the substrate structure 150.

For example, the rear volume V2 of the speaker unit 190 may include a first space V2-1 defined as an inner space of the speaker housing 191 on one side (e.g., an upper side based on the drawing) with respect to the diaphragm 196, a second space V2-2 defined between a surface (e.g., an upper surface 190a) of the speaker unit 190 and the support member 160, a third space V2-3 defined between the support member 160 and the first printed circuit board 151, and a fourth space V2-4 defined between the first printed circuit board 151 and the second printed circuit board 152.

In an embodiment, the support member 160 may include a sealing portion 163, a first portion 161, and a second portion 162.

In various embodiments, the support member 160 may be integrally formed with the speaker housing 191, or may form the speaker housing 191. For example, the support member 160 may have a space formed therein (e.g., an upper-side region based on the drawing) in which components (e.g., the first yoke 192, the second yoke 193, the magnet 194, and the diaphragm 196 of FIG. 5) of the speaker unit 190 are disposed.

In various embodiments, the support member 160 may be integrally coupled to the speaker housing 191. For example, the speaker housing 191 may be integrally provided to the support member 160 through bonding and ultrasonic welding.

In an embodiment, the sealing portion 163 of the support member 160 may be connected to a surface of the speaker unit 190. The sealing portion 163 may substantially seal the rear volume V2 of the speaker unit 190. For example, the sealing portion 163 may be connected to one surface of the speaker unit 190. For example, the sealing portion 163 may be connected to a side surface 190b of the speaker unit 190. In another example, the sealing portion 163 may be connected to the upper surface 190a or a lower surface 190c of the speaker unit 190. For example, the sealing portion 163 may be connected to the speaker unit 190 through bonding and ultrasonic welding.

In various embodiments, the upper surface 190a and the side surface 190b of the speaker unit 190 may be formed by the first yoke (e.g., the first yoke 192 of FIG. 6) of the speaker unit 190 and/or the speaker housing (e.g., the speaker housing 191 of FIG. 6).

In various embodiments, the electronic device 100 may further include a separate sealing member (not illustrated) that connects the support member 160 and the speaker unit 190 to substantially seal the rear volume V2. However, a coupling relationship between the support member 160 and the speaker unit 190 is not necessarily limited to that illustrated in the drawing. For example, the sealing portion 163 may be connected to a portion (e.g., an edge portion) of the upper surface 190a of the speaker unit 190.

In an embodiment, the support member 160 may be formed such that the first portion 161 extends between the speaker unit 190 and the back plate 180 and the second portion 162 extends between the first printed circuit board 151 of the substrate structure 150 and the back plate 180.

In an embodiment, the first portion 161 of the support member 160 may extend from the sealing portion 163 and may be spaced apart from the upper surface 190a of the speaker unit 190 by a predetermined gap. In various embodiments, the first portion 161 may surround at least a portion of the speaker unit 190. In various embodiments, the first portion 161 may include a recessed region in which at least a portion of the speaker unit 190 is disposed.

In an embodiment, the second space V2-2 of the rear volume V2 may be formed between the first portion 161 and the upper surface 190a of the speaker unit 190. In an embodiment, the second space V2-2 may be fluidically connected with the first space V2-1 in the speaker housing 191. For example, the second space V2-2 and the first space V2-1 may be in fluid communication with each other through the second opening 1912 of the speaker housing 191.

In an embodiment, the second portion 162 of the support member 160 may extend into a space between the first printed circuit board 151 and the back plate 180 from the first portion 161 of the support member 160. For example, the second portion 162 may extend such that a partial region of the first printed circuit board 151 is hidden when the first printed circuit board 151 is viewed from above. For example, the second portion 162 may extend to overlap the region in which the first through-holes 157 of the first printed circuit board 151 are formed. In various embodiments, the second portion 162 of the support member 160 may form a passage in fluid communication with the first through-holes 157 of the first printed circuit board 151.

In an embodiment, the second portion 162 of the support member 160 may extend to a surface of the first printed circuit board 151. The second portion 162 extending from the first portion 161 may form the third space V2-3 of the rear volume V2 together with the surface of the first printed circuit board 151. In this case, the third space V2-3 may be in fluid communication with the second space V2-2. In an embodiment, the second portion 162 may surround a portion around the first through-holes 157 formed in the first printed circuit board 151.

In an embodiment, the first printed circuit board 151, the second printed circuit board 152, and the interposer 153 may form the fourth space V2-4 of the rear volume. The fourth space v2-4 may be in fluid communication with the first space V2-1, the second space V2-2, and the third space v2-3 through the first through-holes 157.

In an embodiment, the electronic device 100 may further include a connector 156 that electrically connects the first printed circuit board 151 and the second printed circuit board 152. In the illustrated embodiment, the connector 156 may be disposed in the fourth space V2-4.

In an embodiment, when the diaphragm 196 vibrates in the speaker housing 191, the vibration may be transmitted from the first space V2-1 to the fourth space V2-4 through the second space V2-2 and the third space V2-3 of the rear volume V2. Since the first space V2-1, the second space V2-2, the third space V2-3, and the fourth space V2-4 are in fluid communication with each other, a sound wave may be transmitted with air as a medium. Accordingly, the rear volume V2 of the speaker unit 190 may be expanded.

In various embodiments, the second portion 162 of the support member 160 may include a metallic material. For example, the metallic material may include a SUS material. The second portion 162 may have a smaller thickness when the second portion 162 includes the SUS material than when the second portion 162 includes a polymer material. For example, a SUS portion may have a thickness of about 0.2 mm. This may substantially increase the rear volume V2 of the speaker unit 190 in a given space. In various embodiments, when the second portion 162 of the support member 160 includes the metallic material, the thickness of the second portion 162 may be smaller than the thickness of another portion (e.g., the first portion 161) of the support member 160.

In an embodiment of the disclosure, the arrangement structure of the support member 160, the substrate structure 150, and the speaker unit 190 may substantially increase the rear volume V2 while not increasing the space occupied by the speaker unit 190 in the electronic device 100.

Accordingly, the increased rear volume V2 may substantially improve audio performance when the diaphragm 196 vibrates. For example, as the amount of air included in the rear volume V2 is increased, a low-frequency output may be increased at an output given to the speaker unit 190. In particular, the structure of the electronic device according to an embodiment of the disclosure may be advantageous in a mobile electronic device (e.g., the electronic device 100) having a limited inner space.

In an embodiment, a second opening 143 may be formed in the plate structure 142. The second opening 143 may be at least partially in fluid communication with the first opening 1911 formed in the speaker housing 191. For example, the front volume V1 of the speaker unit 190 may be in fluid communication with a speaker hole (e.g., the speaker hole 107 of FIG. 1) through the first opening 1911 and the second opening 143. For example, as air included in the front volume V1 and air included in the rear volume V2 are vibrated by the diaphragm 196, an audio signal may be generated. An audio signal with the air included in the front volume V1 as a medium may pass through the first opening 1911 or the second opening 143 and may be transmitted to the outside of the electronic device 100 through the speaker hole (e.g., the speaker hole 107 of FIG. 1). In various embodiments, the speaker hole may be formed in at least one of the front plate 120, the frame structure 141, or the back plate 180.

In the illustrated embodiment, the second portion 162 of the support member 160 may form the third space V2-3. In this case, a second height d2 from the first printed circuit board 151 to the rear surface of the support member 160 may be about 1.52 mm. In the illustrated embodiment, a first height d1 of the third space V2-3 may be about 0.82 mm. To expand the third space V2-3, the second portion 162 of the support member 160 that surrounds the third space V2-3 may be formed of a SUS material. In this case, the thickness of a SUS portion may be about 0.2 mm.

Figure 8:
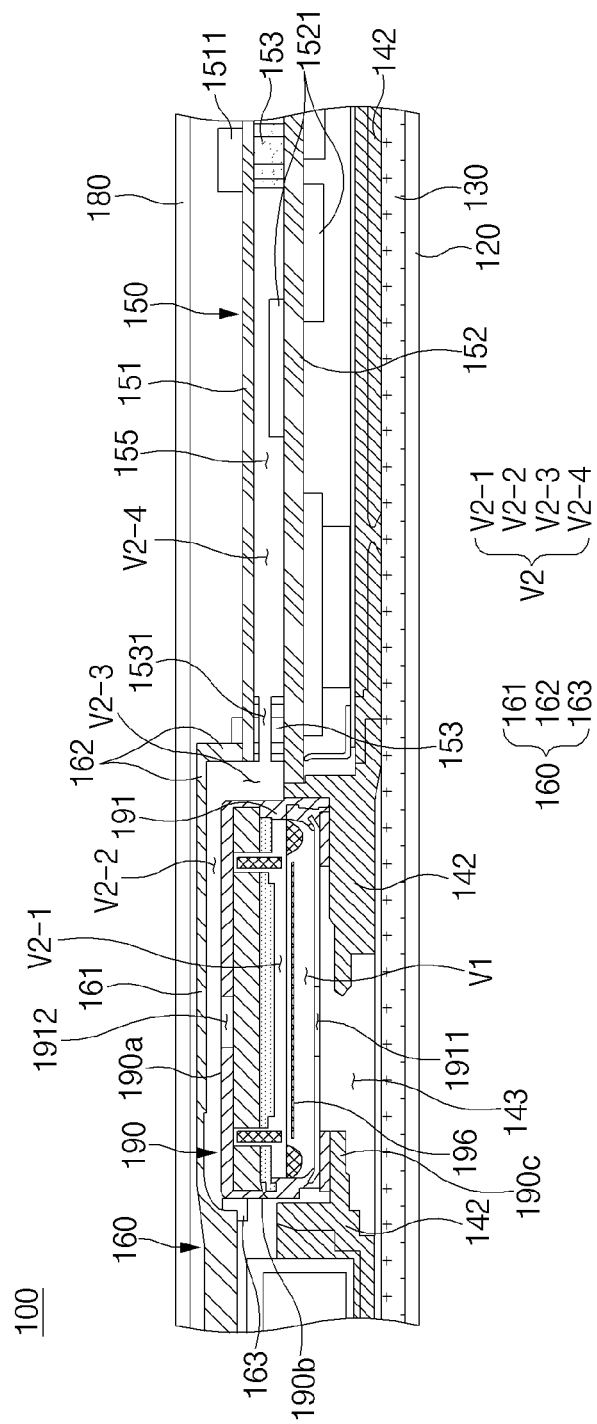
FIG. 8 is a sectional view of the electronic device according to an embodiment of the disclosure.

FIG. 8 is a sectional view of an electronic device according to an embodiment of the disclosure. FIG. 7 may be a sectional view taken along line B-B' of FIG. 4.

Referring to FIG. 8, repetitive descriptions identical to ones given with reference to FIG. 7 will be omitted.

In an embodiment, the support member 160 may be formed such that the first portion 161 extends between the speaker unit 190 and the back plate 180 and the second portion 162 extends between the first printed circuit board 151 of the substrate structure 150 and the back plate 180.

In an embodiment, the second space V2-2 of the rear volume V2 may be formed between the first portion 161 and the upper surface 190a of the speaker unit 190. In an embodiment, the second space V2-2 may be fluidically connected with the first space V2-1 in the speaker housing 191. For example, the second space V2-2 and the first space V2-1 may be in fluid communication with each other through the second opening 1912 of the speaker housing 191.

In an embodiment, the second portion 162 of the support member 160 may extend into the space between the first printed circuit board 151 and the back plate 180 from the first portion 161 of the support member 160. For example, the second portion 162 may extend such that a partial region of the first printed circuit board 151 is hidden when the first printed circuit board 151 is viewed from above.

In an embodiment, the second portion 162 of the support member 160 may extend to cover the space between the interposer 153 and the speaker unit 190. For example, the second portion 162 of the support member 160 may form the third space V2-3 of the rear volume together with the interposer 153, the speaker unit 190, and the second printed circuit board 152. The third space V2-3 may be fluidically connected with the second space V2-2. The third space V2-3 of the rear volume may be fluidically connected with the fourth space V2-4 between the first printed circuit board 151 and the second printed circuit board 152 through a third through-hole 1531 formed in the interposer 153.

In an embodiment, the first printed circuit board 151, the second printed circuit board 152, and the interposer 153 may form the fourth space V2-4 of the rear volume. The fourth space v2-4 may be in fluid communication with the first space V2-1, the second space V2-2, and the third space v2-3 through the third through-hole 1531.

Figure 9:
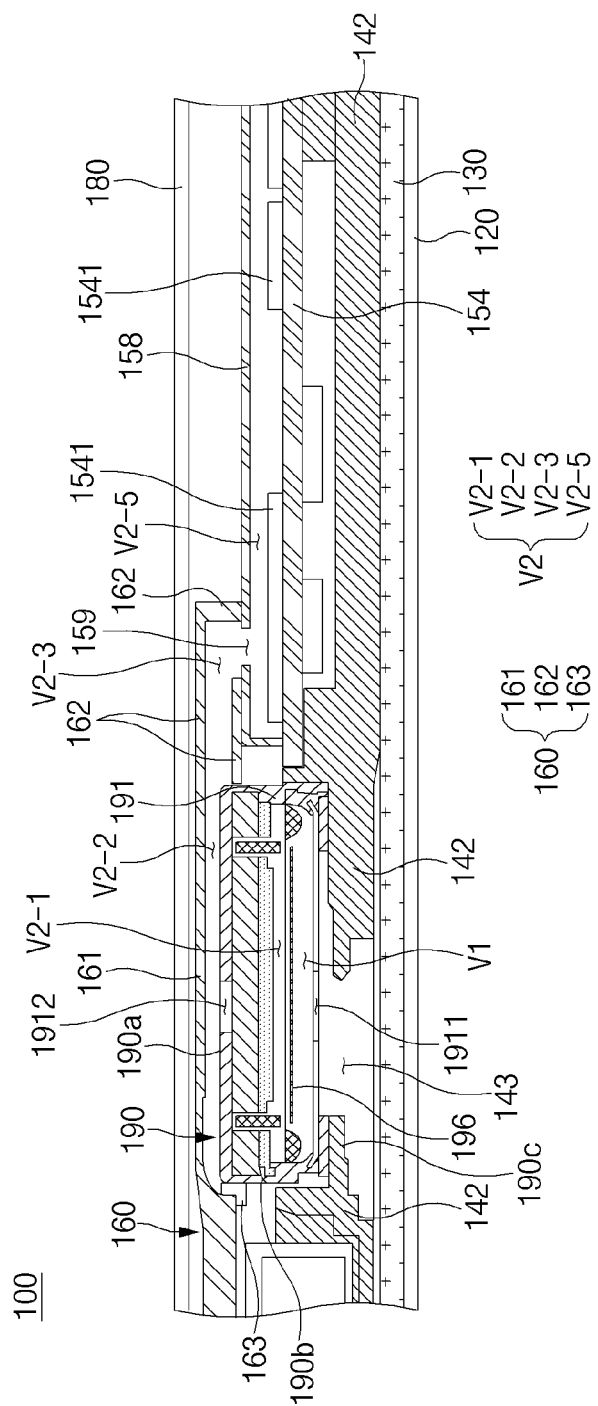
FIG. 9 is a sectional view of the electronic device according to an embodiment of the disclosure.

FIG. 9 is a sectional view of an electronic device according to an embodiment of the disclosure. FIG. 7 may be a sectional view taken along line B-B' of FIG. 4.

Referring to FIG. 9, repetitive descriptions identical to ones given with reference to FIGS. 7 and 8 will be omitted.

In an embodiment, the substrate structure 150 may include a third printed circuit board 154 and a shield can 158 disposed on the third printed circuit board 154.

In an embodiment, the shield can 158 may cover a partial region of the third printed circuit board 154 to shield a third electric element 1541 disposed on the third printed circuit board 154.

In an embodiment, a second through-hole 159 may be formed in the shield can 158. The second through-hole 159 may be fluidically connected with the third space V2-3 that the second portion 162 of the support member forms. A substantially sealed shielding space 155 may be formed between the shield can 158 and a surface of the third printed circuit board 154. The shielding space 155 may be in fluid communication with the third space v2-3 of the rear volume V2 through the second through-hole 159. For example, the shielding space 155 may be defined as a fifth space V2-5 of the rear volume V2.

In an embodiment, the second portion 162 of the support member 160 may extend to a surface of the shield can 158 to surround a portion around the second through-hole 159. The second portion 162 of the support member 160 may form a passage that is substantially in fluid communication with the second through-hole 159.

Figure 10:
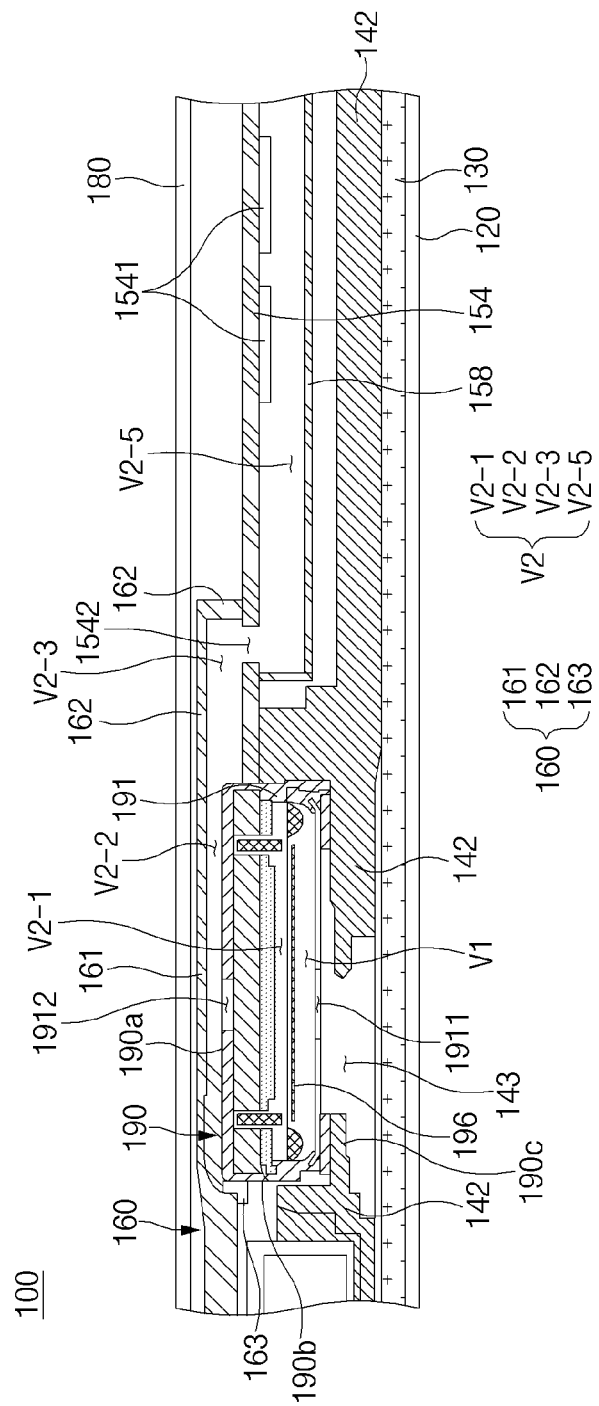
FIG. 10 is a sectional view of the electronic device according to an embodiment of the disclosure.

FIG. 10 is a sectional view of an electronic device according to another embodiment of the disclosure.

Referring to FIG. 10, repetitive descriptions identical to ones given with reference to FIGS. 7, 8, and 9 will be omitted. FIG. 10 may be a sectional view taken along line B-B' of FIG. 4.

In an embodiment, the substrate structure 150 may include the third printed circuit board 154 and the shield can 158 disposed on the third printed circuit board 154.

In an embodiment, the shield can 158 may cover a partial region of the third printed circuit board 154 to shield the third electric element 1541 disposed on the third printed circuit board 154.

In an embodiment, a fourth through-hole 1542 may be formed in the third printed circuit board 154. The fourth through-hole 1542 may be fluidically connected with the third space V2-3 that the second portion 162 of the support member 160 forms. The substantially sealed shielding space 155 may be formed between the shield can 158 and a surface of the third printed circuit board 154. The shielding space 155 may be in fluid communication with the third space V2-3 of the rear volume V2 through the fourth through-hole 1542. For example, the shielding space 155 may be defined as the fifth space V2-5 of the rear volume V2.

In an embodiment, the second portion 162 of the support member 160 may extend to the surface of the third printed circuit board 154 to surround a portion around the fourth through-hole 1542. For example, the second portion 162 of the support member 160 may be connected to one surface of the third printed circuit board 154, and the shield can 158 may be disposed on an opposite surface of the third printed circuit board 154. In an embodiment, the second portion 162 of the support member 160 may form a passage that is substantially in fluid communication with the fourth through-hole 1542.

Accordingly, when the diaphragm 196 vibrates, a sound wave may travel from the first space V2-1 to the fifth space V2-5 through the second space V2-2 and the third space V2-3 of the rear volume V2. The structures illustrated in FIGS. 9 and 10 may have an advantageous effect of substantially increasing the rear volume V2 of the speaker unit 190 in the limited inner space of the electronic device 100. The increased rear volume V2 may increase a low-frequency output.

An electronic device 100 according to embodiments of the disclosure may include a housing 110, a first printed circuit board 151 disposed in the housing 110, a speaker unit 190 disposed adjacent to the first printed circuit board, the speaker unit 190 including a speaker housing 191 and a diaphragm 196 that is disposed in the speaker housing and that vibrates based on an electrical signal, and a support member 160 including a first portion 161 that surrounds at least a portion of the speaker unit 190 and that is spaced apart from a surface of the speaker unit 190 by a predetermined gap and a second portion 162 that extends from the first portion 161 to cover a surface of at least a portion of the first printed circuit board 151 when the first printed circuit board 151 is viewed from above. A first space V2-1 located on one side of the diaphragm 196 may be formed in the speaker housing 191, and a second space V2-2 in fluid communication with the first space V2-1 may be formed between the first portion 161 and the surface of the speaker unit 190. The second portion 162 and the first printed circuit board 151 may form at least a portion of a substantially sealed third space V2-3 in fluid communication with the second space V2-2.

In various embodiments, the electronic device may further include a second printed circuit board 152 that faces the first printed circuit board 151 and an interposer 153 that surrounds a substantially sealed fourth space V2-4 between the first printed circuit board 151 and the second printed circuit board 152. A first through-hole 157 may be formed in the first printed circuit board 151 such that the third space V2-3 and the fourth space V2-4 are in fluid communication with each other. The first space V2-1, the second space V2-2, the third space V2-3, and the fourth space V2-4 may form a substantially sealed rear volume V2 of the speaker unit 190.

In various embodiments, the first through-hole 157 may be formed to overlap the support member 160 when the first printed circuit board 151 is viewed from above.

In various embodiments, the first printed circuit board 151 may include a plurality of first electric elements, the second printed circuit board 152 may include a plurality of second electric elements, and at least one of the plurality of first electric elements and/or at least one of the plurality of second electric elements may be located in the fourth space V2-4.

In various embodiments, a conductive pattern may be formed on the support member 160, and the conductive pattern may be electrically connected with communication circuitry disposed on the first printed circuit board 151.

In various embodiments, the electronic device may further include a shield can 158 disposed on the first printed circuit board 151. The shield can 158 may form a substantially sealed fifth space V2-5 together with a surface of the first printed circuit board. A second through-hole 159 may be formed in the shield can 158 such that the fifth space V2-5 and the third space V2-3 are in fluid communication with each other. The first space V2-1, the second space V2-2, the third space V2-3, and the fifth space V2-5 may form a substantially sealed rear volume V2 of the speaker unit 190.

In various embodiments, the support member 160 may further include a sealing portion 163 connected to the surface of the speaker unit 190 such that the second space V2-2 is substantially sealed.

In various embodiments, the first portion 161 of the support member 160 may include a recessed region in which at least a portion of the speaker unit 190 is accommodated.

In various embodiments, the second portion 162 of the support member 160 may include a metallic material, and the second portion 162 may have a smaller thickness than the first portion 161.

In various embodiments, the speaker unit 190 may further include a magnet 194 disposed in the speaker housing 191 and a coil 195 that surrounds the magnet 194 a plurality of times and to which the electrical signal is applied, and the coil 195 may be connected with the diaphragm 196 to vibrate the diaphragm 196 based on the electrical signal.

In various embodiments, the speaker unit 190 may further include a yoke 192 or 193 that surrounds at least a portion of the magnet 194.

In various embodiments, the electronic device may further include a plate structure 142 disposed in the housing 110 and a display 130 disposed on a first surface of the plate structure 142, and the first printed circuit board 151 and the speaker unit 190 may be disposed on a second surface of the plate structure 142.

In various embodiments, a first opening 1911 that faces toward the second surface of the plate structure 142 may be formed in the speaker housing 191. A front volume V1 located on an opposite side of the diaphragm 196 and in fluid communication with the first opening 1911 may be defined in the speaker housing 191. A second opening 143 that penetrates the first surface and the second surface and is in fluid communication with the first opening 1911 may be formed in the plate structure 142.

In various embodiments, a speaker hole in fluid communication with the first opening 1911 and/or the second opening 143 may be formed in the housing 110.

An electronic device 100 according to embodiments of the disclosure may include a front plate 120 that forms a front surface, a back plate 180 that forms a rear surface and faces away from the front plate, a bracket 140 including a frame structure 141 that surrounds a space between the front plate 120 and the back plate 180 and a plate structure 142 that extends into the space between the front plate 120 and the back plate 180 from the frame structure 141, a support member 160 disposed between the plate structure 142 and the back plate 180, a substrate structure, at least a portion of which is disposed between the support member and the plate structure, and a speaker unit 190 disposed between the support member and the plate structure. The substrate structure may include a first printed circuit board 151 connected with the support member 160 and having a first through-hole 157 formed therein, a second printed circuit board 152 disposed on the plate structure 142, and an interposer 153 that surrounds a third space V2-3 between the first printed circuit board 151 and the second printed circuit board 152. The support member 160 may surround at least a portion of the speaker unit 190 to form a second space V2-2 in fluid communication with a first space V2-1 in the speaker unit 190 and may extend to the first printed circuit board 151 such that the second space V2-2 is in fluid communication with the third space V2-3.

In various embodiments, at least a portion of the support member 160 may form a passage in fluid communication with the first through-hole 157.

In various embodiments, an antenna pattern may be formed on the support member 160.

In various embodiments, a region having the first through-hole 157 formed therein may overlap the support member 160 when the first printed circuit board 151 is viewed from above.

In various embodiments, the speaker unit 190 may include a speaker housing 191 having an opening 1911 formed therein to be open in a direction toward the plate structure 142 and a diaphragm 196 disposed in the speaker housing 191 and configured to vibrate.

A fourth space V2-4 substantially sealed from the first space V2-1 by the diaphragm 196 and in fluid communication with the opening 1911 and the first space V2-1 may be defined in the speaker housing 191.

In various embodiments, a speaker hole in fluid communication with the fourth space V2-4 may be formed in at least one of the frame structure 141, the front plate 120, or the back plate 180.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

According to the situation, the expression "adapted to or configured to" used in this disclosure may be used interchangeably with, for example, the expression "suitable for", "having the capacity to", "adapted to", "made to", "capable of", or "designed to" in hardware or software. The expression "a device configured to" may mean that the device is "capable of" operating together with another device or other components. For example, a "processor set to (or configured to) perform A, B, and C" may mean a dedicated processor (e.g., an embedded processor) for performing corresponding operations or a generic-purpose processor (e.g., a CPU or an AP) that performs corresponding operations by executing one or more programs stored in a memory device.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. The "module" may be implemented mechanically or electronically and may include, for example, an application-specific integrated circuit (ASIC) chip, field-programmable gate arrays (FPGAs), or a programmable-logic device for performing some operations.

At least a part of an apparatus (e.g., modules or functions thereof) or a method (e.g., operations) according to various embodiments may be implemented by instructions stored in computer-readable storage media in the form of a program module. The instructions, when executed by a processor, may cause the processor to perform functions corresponding to the instructions. The computer-readable storage media may include a hard disk, a floppy disk, a magnetic media (e.g., a magnetic tape), an optical media (e.g., CD-ROM, DVD, magneto-optical media (e.g., a floptical disk)), an embedded memory, and the like. The instructions may include a code made by a compiler or a code executable by an interpreter.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a first printed circuit board disposed in the housing;
   a speaker device disposed adjacent to the first printed circuit board, the speaker device including a speaker housing and a diaphragm disposed in the speaker housing, the diaphragm being configured to vibrate based on an electrical signal; and
   a support member including a first portion and a second portion, the first portion surrounding at least a portion of the speaker device and being spaced apart from a surface of the speaker device by a predetermined gap, the second portion extending from the first portion and covering a surface of at least a portion of the first printed circuit board when the first printed circuit board is viewed from above,
   wherein a first space located on one side of the diaphragm is formed in the speaker housing,
   wherein a second space in fluid communication with the first space is formed between the first portion and the surface of the speaker device, and
   wherein the second portion and the first printed circuit board form at least a portion of a substantially sealed third space in fluid communication with the second space.

2. The electronic device of claim 1, further comprising:
   a second printed circuit board facing the first printed circuit board; and
   an interposer surrounding a substantially sealed fourth space between the first printed circuit board and the second printed circuit board,
   wherein a first through-hole is formed in the first printed circuit board such that the substantially sealed third space and the substantially sealed fourth space are in fluid communication with each other, and
   wherein the first space, the second space, the substantially sealed third space, and the substantially sealed fourth space form a substantially sealed rear volume of the speaker device.

3. The electronic device of claim 2, wherein the first through-hole overlaps the support member when the first printed circuit board is viewed from above.

4. The electronic device of claim 2,
   wherein the first printed circuit board includes a plurality of first electric elements,
   wherein the second printed circuit board includes a plurality of second electric elements, and
   wherein one or both of at least one of the plurality of first electric elements and at least one of the plurality of second electric elements is located in the substantially sealed fourth space.

5. The electronic device of claim 1,
   wherein a conductive pattern is formed on the support member, and
   wherein the conductive pattern is electrically connected with communication circuitry disposed on the first printed circuit board.

6. The electronic device of claim 1, further comprising:
   a shield can disposed on the first printed circuit board,
   wherein the shield can forms a substantially sealed fifth space together with a surface of the first printed circuit board,
   wherein a second through-hole is formed in the shield can such that the substantially sealed fifth space and the substantially sealed third space are in fluid communication with each other, and
   wherein the first space, the second space, the substantially sealed third space, and the substantially sealed fifth space form a substantially sealed rear volume of the speaker device.

7. The electronic device of claim 1, wherein the support member further includes a sealing portion connected to the surface of the speaker device such that the second space is substantially sealed.

8. The electronic device of claim 1, wherein the first portion of the support member further includes a recessed region in which at least a portion of the speaker device is accommodated.

9. The electronic device of claim 1,
   wherein the second portion of the support member includes a metallic material, and
   wherein the second portion has a smaller thickness than the first portion.

10. The electronic device of claim 1,
    wherein the speaker device further includes a magnet and a coil,
    wherein the magnet is disposed in the speaker housing and the coil surrounds the magnet a plurality of times, wherein the electrical signal is applied to the coil,
wherein the coil is connected to the diaphragm, and
wherein the diaphragm vibrates based on the electrical signal applied to the coil.

11. The electronic device of claim 10, wherein the speaker device further includes a yoke surrounding at least a portion of the magnet.

12. The electronic device of claim 1, further comprising:
a plate structure disposed in the housing, the plate structure including a first surface and a second surface opposite the first surface; and
a display disposed on the first surface of the plate structure,
wherein the first printed circuit board and the speaker device are disposed on the second surface of the plate structure.

13. The electronic device of claim 12,
wherein a first opening facing the second surface of the plate structure is formed in the speaker housing,
wherein a front volume located on an opposite side of the diaphragm and in fluid communication with the first opening is defined in the speaker housing, and
wherein a second opening penetrating the first surface and the second surface and being in fluid communication with the first opening is formed in the plate structure.

14. The electronic device of claim 13, wherein a speaker hole in fluid communication with at least one of the first opening or the second opening is formed in the housing.

15. An electronic device comprising:
a front plate forming a front surface;
a back plate forming a rear surface and facing away from the front plate;
a bracket including a frame structure surrounding a space between the front plate and the back plate and a plate structure extending into the space between the front plate and the back plate from the frame structure;
a support member disposed between the plate structure and the back plate;
a substrate structure, at least a portion of which is disposed between the support member and the plate structure; and
a speaker device disposed between the support member and the plate structure,
wherein the substrate structure includes a first printed circuit board being connected to the support member and having a first through-hole formed therein, a second printed circuit board being disposed on the plate structure, and an interposer surrounding a third space between the first printed circuit board and the second printed circuit board,
wherein the support member surrounds at least a portion of the speaker device to form a second space in fluid communication with a first space in the speaker device, and
wherein the support member extends to the first printed circuit board such that the second space is in fluid communication with the third space.

16. The electronic device of claim 15, wherein at least a portion of the support member forms a passage in fluid communication with the first through-hole.

17. The electronic device of claim 15, wherein an antenna pattern is formed on the support member.

18. The electronic device of claim 15, wherein a region having the first through-hole formed therein overlaps the support member when the first printed circuit board is viewed from above.

19. The electronic device of claim 15,
wherein the speaker device comprises:
a speaker housing having an opening formed therein to be open in a direction toward the plate structure; and
a diaphragm disposed in the speaker housing and configured to vibrate, and
wherein a fourth space, which is substantially sealed from the first space by the diaphragm and is in fluid communication with the opening and the first space, is defined in the speaker housing.

20. The electronic device of claim 19, wherein a speaker hole in fluid communication with the fourth space is formed in at least one of the frame structure, the front plate, or the back plate.

* * * * *